(12) United States Patent
Ikeyama et al.

(10) Patent No.: US 10,090,678 B2
(45) Date of Patent: Oct. 2, 2018

(54) PRODUCTION ENERGY MANAGEMENT SYSTEM AND COMPUTER PROGRAM

(71) Applicant: YOKOGAWA ELECTRIC CORPORATION, Tokyo (JP)

(72) Inventors: Tomoyuki Ikeyama, Tokyo (JP); Hiroshi Watanabe, Tokyo (JP); Ken-ichi Inoue, Tokyo (JP); Akira Seki, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 371 days.

(21) Appl. No.: 14/785,668

(22) PCT Filed: Mar. 12, 2014

(86) PCT No.: PCT/JP2014/056501
§ 371 (c)(1),
(2) Date: Oct. 20, 2015

(87) PCT Pub. No.: WO2014/174928
PCT Pub. Date: Oct. 30, 2014

(65) Prior Publication Data
US 2016/0079756 A1    Mar. 17, 2016

(30) Foreign Application Priority Data

Apr. 23, 2013   (JP) ................... 2013-090548

(51) Int. Cl.
*H02J 3/38*       (2006.01)
*G06Q 50/04*   (2012.01)
(Continued)

(52) U.S. Cl.
CPC ............. *H02J 3/381* (2013.01); *G05B 17/02* (2013.01); *G06Q 10/067* (2013.01); *G06Q 50/04* (2013.01);
(Continued)

(58) Field of Classification Search
CPC ...... G05B 17/02; G06Q 10/067; G06Q 50/04; H02J 3/381; Y02P 90/14; Y02P 90/30; Y02P 90/82
See application file for complete search history.

(56) References Cited

U.S. PATENT DOCUMENTS

2002/0133270 A1* 9/2002 Hung ............... F22B 35/18
                                                                        700/286
2009/0177505 A1* 7/2009 Dietrich ........... G06Q 10/06375
                                                                        705/7.37
(Continued)

FOREIGN PATENT DOCUMENTS

JP        2010-067114 A      3/2010

OTHER PUBLICATIONS

Katsutomo Tanaka et al., "Enerize E3 Factory Energy Management System", Yokogawa Technical Report, 2010, pp. 23-26, vol. 53, No. 1.

Primary Examiner — Kenneth M Lo
Assistant Examiner — Mohammad A Rahman
(74) Attorney, Agent, or Firm — Sughrue Mion, PLLC

(57) ABSTRACT

A production energy management system is provided, including a production and energy flow model definer configured to define a production and energy flow model wherein the production and energy flow model represents, by directed lines, a flow with regard to an input and output of a production-related material between apparatuses disposed in a plant and a flow with regard to an input and output of energy and associates index values of the production-related material and the energy with a kind of metered data measured in the plant, a data collector configured to collect the metered data from the plant, and an energy calculator configured to perform an energy calculation for each appa- (Continued)

ratus based on the collected metered data and the defined production and energy flow model.

15 Claims, 12 Drawing Sheets

(51) Int. Cl.
*G06Q 10/06* (2012.01)
*G05B 17/02* (2006.01)

(52) U.S. Cl.
CPC .............. *Y02P 90/14* (2015.11); *Y02P 90/30* (2015.11); *Y02P 90/82* (2015.11)

(56) References Cited

U.S. PATENT DOCUMENTS

| | | | |
|---|---|---|---|
| 2012/0078404 A1* | 3/2012 | Saito | G05B 19/4184 700/97 |
| 2012/0083933 A1* | 4/2012 | Subbu | G06N 3/02 700/291 |
| 2012/0123600 A1* | 5/2012 | Krause | G05B 15/02 700/286 |
| 2013/0073062 A1 | 3/2013 | Smith et al. | |
| 2013/0082834 A1* | 4/2013 | Nagai | G05B 23/0254 340/521 |
| 2013/0096727 A1* | 4/2013 | Brandt | G05B 19/4186 700/291 |
| 2014/0163908 A1* | 6/2014 | Kubota | G01R 21/133 702/61 |
| 2015/0248118 A1* | 9/2015 | Li | G05B 13/04 700/295 |

* cited by examiner

FIG. 6
PRODUCTION AND ENERGY FLOW OF ENTIRE PETROLEUM REFINING PLANT
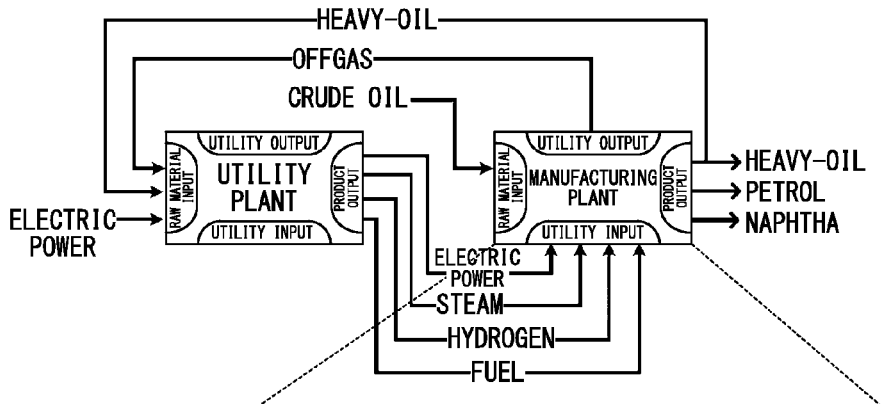
PRODUCTION AND ENERGY FLOW OF ENTIRE MANUFACTURING PLANT
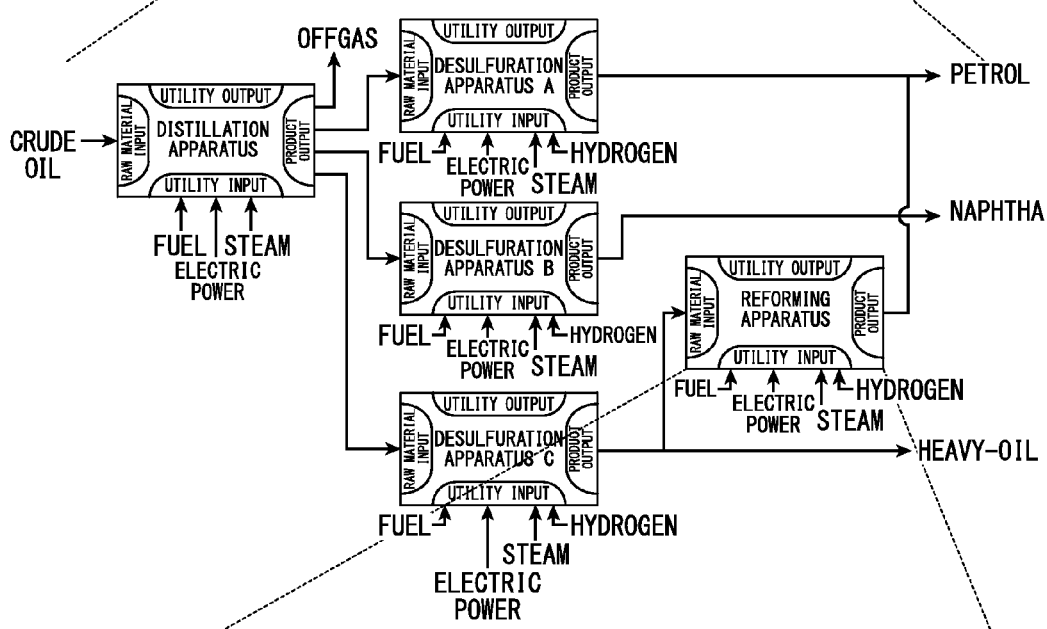
PRODUCTION AND ENERGY FLOW OF REFORMING APPARATUS
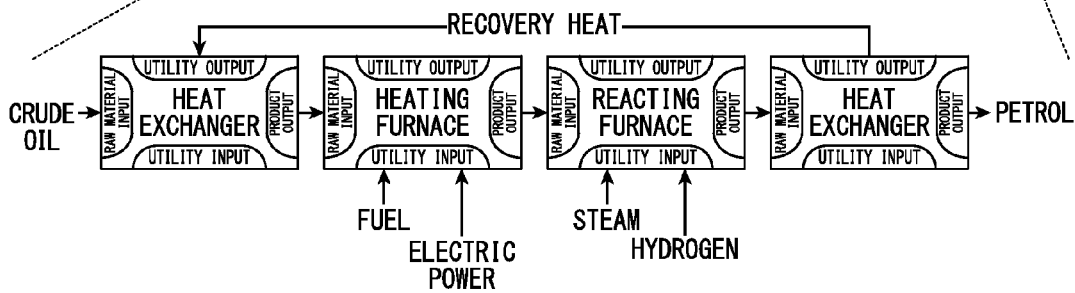

PRODUCTION ENERGY MANAGEMENT SYSTEM AND COMPUTER PROGRAM

TECHNICAL FIELD

The present invention relates to a production energy management system. In particular, the present invention relates to a production energy management system and a computer program suitable for a continuous process.

Priority is claimed on Japanese Patent Application No. 2013-090548, filed on Apr. 23, 2013, the contents of which are incorporated herein by reference.

BACKGROUND ART

A production energy management system is known for modeling the flow of energy and the flow of products in a plant and evaluating the energy usage condition based on the metered energy usage, the production, and the like. The production energy management system visualizes the current status of the energy consumption, the improvement, and the like, in other words, realizes the "visualization", clarifies the operation indexes associated with the energy of a factory, and thereby supports the optimization of the energy usage.

For example, a production energy management system described in Patent Literature 1 and Non-Patent Literature 1 collects energy information and production information in a production line and links the energy information to the production information, and thereby calculates the energy consumption, the $CO_2$ emission, the energy cost, the production efficiency, the specific energy consumption and the like, per product or per lot. The specific energy consumption is an index, which is obtained by dividing the energy consumption used for producing products by the production of the products, the input amount of raw materials, the production of interim products, or the like.

As shown in FIG. 14, the linking of the energy information and the production information is performed by associating an energy flow model, which models the energy flow in a plant, with a production flow model, which models the production flow between apparatuses, devices, or the like (collectively referred to as apparatuses).

Processes in a plant may be divided into a batch process and a continuous process based on their production systems. The batch process is a non-continuous process where a series of operations is added and mainly materials having any shape are processed or combined to produce products, such as in a mechanical industry plant.

On the other hand, the continuous process is a process where both materials and products are mainly fluids such as liquid or gas, the materials continuously flow into an apparatus, the materials are continuously processed during flowing through the apparatus, and the products also continuously flow from the apparatus, such as in a petroleum refining plant or a chemical plant.

In the batch process, the relationship is clear between the energy, which is supplied to the apparatus and consumed, and the products in each apparatus, while, in the continuous process, there are some cases where the products include energy as potential heat, a part of the products is circulated in the apparatus or temporarily stored in the apparatus. In addition, there are some cases where a part of products is used as energy.

As shown in FIG. 14, a conventional production energy system defines an energy flow model, calculates electric power energy, steam energy, energy of cold-water, and the like, which are introduced into an apparatus, and thereby calculates the energy consumption. A production flow model is defined and the production is calculated in each apparatus.

Though the calculation method using such a model is suitable for the batch process where the relationship is clear between the energy, which is supplied to the apparatus and consumed, and the products in each apparatus, the calculation method is not suitable for the continuous process where there is a wide range of variations in paths of the products and the consideration for the energy of the products is required.

CITATION LIST

Patent Literature

PTL1: Japanese Patent Application Laid-Open Publication No. 2010-67114 Non-Patent Literature
NPTL1: "Enerize E3 Factory Energy Management System", Yokogawa Technical Report, Vol. 53, 2010, Energy saving special issue

SUMMARY OF INVENTION

Technical Problem

One aspect of the present invention provides a production energy management system and a computer program suitable for a continuous process.

Solution to Problem

A production energy management system according to a first aspect of the present invention may include a production and energy flow model definer configured to define a production and energy flow model wherein the production and energy flow model represents, by directed lines, a flow with regard to an input and output of a production-related material between apparatuses disposed in a plant and a flow with regard to an input and output of energy and associates index values of the production-related material and the energy with a kind of metered data measured in the plant, a data collector configured to collect the metered data from the plant, and an energy calculator configured to perform an energy calculation for each apparatus based on the collected metered data and the defined production and energy flow model.

In the production energy management system according to the first aspect, the energy calculator may be configured to calculate at least one of an energy consumption, an energy cost, a $CO_2$ emission, a specific energy consumption, an energy efficiency, an index value associated with a user setting, and an index value of a combination thereof.

In the production energy management system according to the first aspect, in the production and energy flow model, a symbol representing the apparatus may include a raw material input to which a directed line representing an input of the production-related material to the apparatus is connected, a product output to which a directed line representing an output of the production-related material from the apparatus is connected, a utility input to which a directed line representing an input of the energy to the apparatus is connected, and a utility output to which a directed line representing an output of the energy from the apparatus is connected.

In the production energy management system according to the first aspect, the production and energy flow model may include, as the index value of the production-related material, a potential heat treated as an energy amount.

In the production energy management system according to the first aspect, the production and energy flow model may define a circulation of the production-related material in the same apparatus as the flow with regard to the input and output of the production-related material.

In the production energy management system according to the first aspect, the production and energy flow model may define, as the flow treating a part of or all of the production-related material as a fuel, a part of or all of the production-related material as an energy amount.

In the production energy management system according to the first aspect, the production and energy flow model may collectively define a plurality of apparatuses as a subsystem and treats the subsystem as a single apparatus. The subsystem may include a hierarchical structure.

In the production energy management system according to the first aspect, the production and energy flow model may define a temporal storing of the production-related material in a storage apparatus as the flow with regard to the input and output of the production-related material.

In the production energy management system according to the first aspect, the production and energy flow model may define, as the flow with regard to the input and output of the production-related material, a time delay of the production-related material with regard to a transfer between the apparatuses, a processing time, and a reaction time and a delay represented by a transfer function or a function associated with a user definition.

The production energy management system according to the first aspect may further include a data display configured to change a display form of the directed line in the production and energy flow model based on a calculation result by the energy calculator.

The production energy management system according to the first aspect may further include a baseline model calculator configured to calculate a baseline function, the baseline function representing a relational expression between an energy calculation result for each apparatus and a factor extracted based on an evaluation result with regard to a correlation with the energy calculation result.

The production energy management system according to the first aspect may further include a data display configured to compare and display an actual factor and an actual energy index value, and an estimated energy index value calculated based on the actual factor and the baseline function.

In the production energy management system according to the first aspect, the factor may include at least one of an input amount of the production-related material, a temperature and a humidity around the apparatus, an operation mode of the plant, and a kind and a production area of the production-related material.

The production energy management system according to the first aspect may further include a field database storing the metered data and a production and energy flow model database storing the production and energy flow model. The energy calculator may be configured to perform the energy calculation using the metered data stored in the field database in accordance with the production and energy flow model stored in the production and energy flow model database.

A computer program according to a second aspect of the present invention may make a computer execute, defining a production and energy flow model wherein the production and energy flow model represents, by directed lines, a flow with regard to an input and output of a production-related material between apparatuses disposed in a plant and a flow with regard to an input and output of energy and associates index values of the production-related material and the energy with a kind of metered data measured in the plant, collecting the metered data from the plant, and performing an energy calculation for each apparatus based on the collected metered data and the defined production and energy flow model.

Advantageous Effects of Invention

According to the one aspect of the present invention, the production energy management system and the computer program suitable for a continuous process are provided.

BRIEF DESCRIPTION OF DRAWINGS

FIG. 6 is a diagram showing an example of the hierarchical structure of the production and energy flow model.

DESCRIPTION OF EMBODIMENTS

Figure 1:
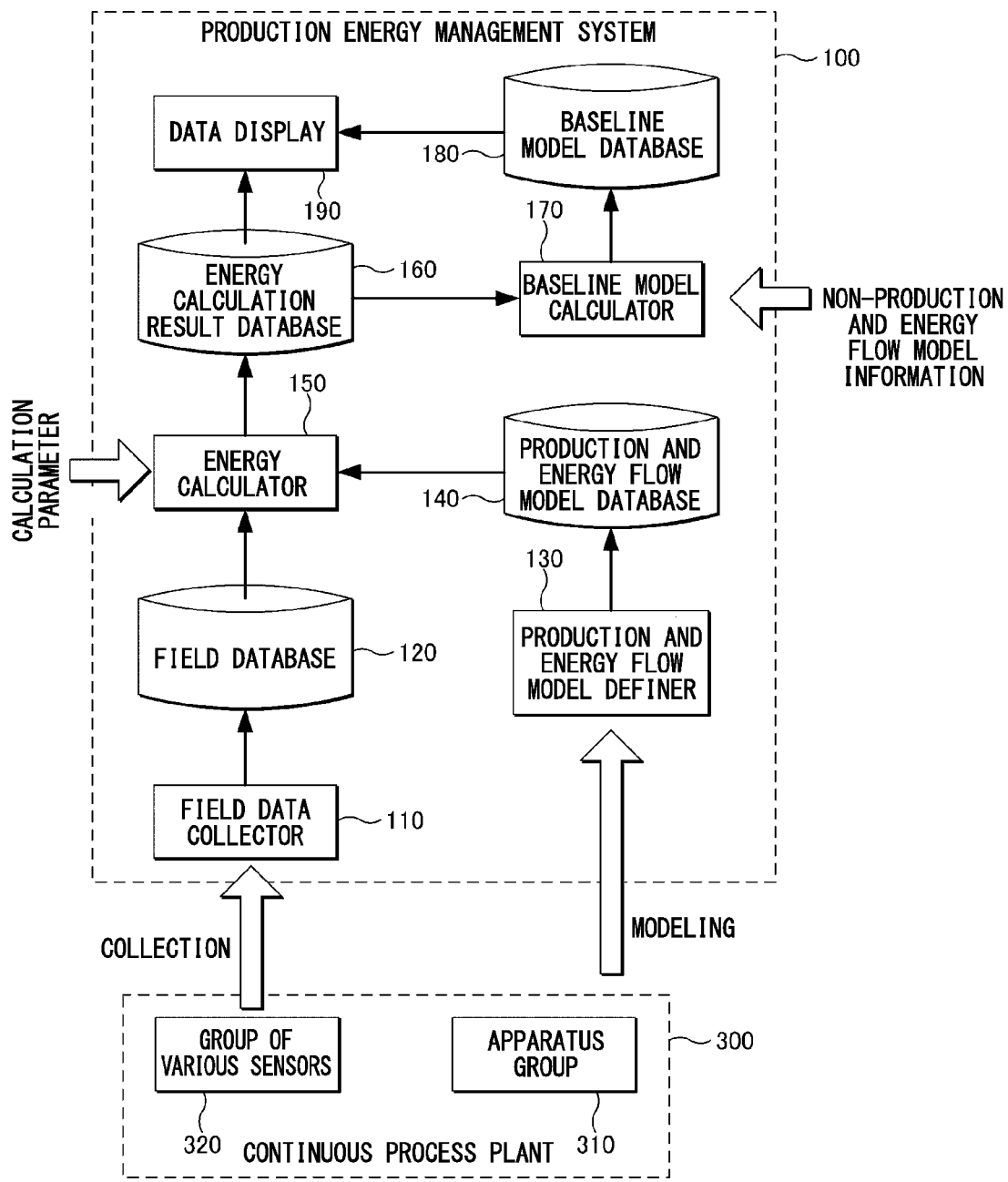
FIG. 1 is a block diagram showing the constitution of a production energy management system according to one embodiment of the present invention.

A production energy management system and a computer program according to one embodiment of the present invention will be described with reference made to the drawings. FIG. 1 is a block diagram showing the constitution of a production energy management system 100 according to one embodiment of the present invention. In the present embodiment, the production energy management system 100 supports energy operations of a plant 300 for a continuous process. The plant 300 for the continuous process includes a group 310 of apparatuses including a plurality of apparatuses, devices, or the like and a group 320 of various sensors such as flow gauges, electrical power meters, thermometers, and the like. The group 320 of various sensors is mainly disposed along with the group 310 of apparatuses.

As shown in FIG. 1, the production energy management system 100 includes a field data collector 110, a field database 120, a production and energy flow model definer 130, a production and energy flow model database 140, an energy calculator 150, an energy calculation result database 160, a baseline model calculator 170, a baseline model database 180, and a data display 190.

The production energy management system 100 may consist of for example, one or more computers, which operate in accordance with computer programs and a peripheral device such as an external storage device, a monitor, and an input-output device.

The field data collector 110 collects data measured by the group 320 of various sensors, which is disposed in the continuous process plant 300 and stores the data into the field database 120. The metered data collected by the field data collector 110 relate to the energy consumption, but include the production, surrounding temperature and humidity, and the like, which do not directly relate to the energy amount.

The field database 120 stores the metered data collected by the field data collector 110. Each metered data may be summarized in chronological order for each collection cycle and stored in the database. The edit such as unit conversion and index addition may be performed.

The production and energy flow model definer 130 defines a production and energy flow model, which models the flow of the materials, the products, and the like in the group 310 of apparatuses of the continuous process plant 300, and the flow of the energy. When the production and energy flow model is defined, a graphical interface, which uses various symbols indicating the kind of apparatus and energy, may be provided so as to support the model definition operation of engineers or service personnel.

The production and energy flow model also defines the relationship between the index values such as the quantity of materials, the temperature, and the energy amount defined by the model and the kind of the metered data used for the calculation of these index values. An energy consumption calculation method, a production calculation method, and the like in accordance with the attributes of the apparatus defined by the model are also defined. The attributes of the apparatus includes, for example, an apparatus where energy and materials are circulated, an apparatus where a plurality of materials and a plurality of products are continuously produced, an apparatus temporally storing products and materials, and the like.

The production and energy flow model database 140 stores the model defined by a graphical interface along with the graphical information.

The energy calculator 150 performs the energy calculation using the metered data stored in the field database 120 in accordance with the definition of the model stored in the production and energy flow model database 140. The calculation results are stored in the energy calculation result database 160.

The items of the energy calculation includes an energy consumption, an energy cost, a $CO_2$ emission, a specific energy consumption, an energy efficiency, an index value associated with a user setting, an index value of a combination thereof, a calculated index value, a calculation result, an index value obtained based on the calculation result, and the like, and the calculation may be performed for an entire factory, for each apparatus, or for each subsystem consisting of apparatuses, which are optionally specified. The index value associated with the user setting is an index optionally specified by a user for the energy management and includes an energy consumption, an energy cost, a specific energy consumption, an energy efficiency, and the like. More complicated index may be optionally set in accordance with the purpose of the management. For example, an index value where an arithmetic expression or a condition expression is incorporated into the energy efficiency may be set. In addition, the index value of the combination thereof is an index value where an optional index value and an optional index value are combined with each other, and may be set by performing the addition, subtraction, multiplication and division of the index values, and the like. When the energy calculation is performed, parameters for a calculation such as an energy unit price, a $CO_2$ emission coefficient, a specific heat of materials for each energy source such as electricity, gas, and heavy-oil.

The energy calculation result database 160 stores the energy calculation results calculated by the energy calculator 150.

The baseline model calculator 170 generates a baseline model based on the calculation results stored in the energy calculation result database, and the like. The generated baseline mode is stored in the baseline model database 180.

Based on the energy calculation results in a period specified by operators, the baseline model represents, using a function, the relationship between the energy consumption for the period and the factor, which influences the energy consumption. This function is referred to as a baseline function.

The factor may include the input amount of materials, the surrounding environment of the apparatus such as temperature and humidity, the operation mode of a plant, the kind and production area of materials, and the like, and information other than the metered data stored in the field database 120. Such information other than the metered data may be incorporated as non-production and energy flow model information. The baseline model may be generated for each apparatus, each subsystem, or the like.

The baseline model database 180 records the baseline function generated by the baseline model calculator 170.

The data display 190 displays, using various graphs, diagrams, and the like, the information such as the energy consumption, the energy cost, the $CO_2$ emission amount, the specific energy consumption, and the energy efficiency, which are recorded in the energy calculation result database 160, and the information based on the baseline function recorded in the baseline model database 180, and the like.

Next, the operations of the production energy management system 100 according to the present embodiment will be described with reference to the flowchart in FIG. 2. The operations of the production energy management system 100 may be divided into a pre-processing (S101) and operational processing (S102 to S107).

The pre-processing defines, using the production and energy flow model definer 130, a production and energy flow model corresponding to a plant targeted for the energy operation support (S101). The plant targeted for the energy operation support may be a part of a plant or include a plurality of plants.

The production and energy flow model represents the flow of materials, raw materials, products, products in process, and the like (collectively referred to as a "production-related material") and the flow of the energy by connecting them using directed lines clarifying the input-output direction, between the apparatuses consisting a plant. Since there are some cases where the production-related material is treated as energy in the continuous process, the production-related material and the energy is treated in a single model.

Figure 3:
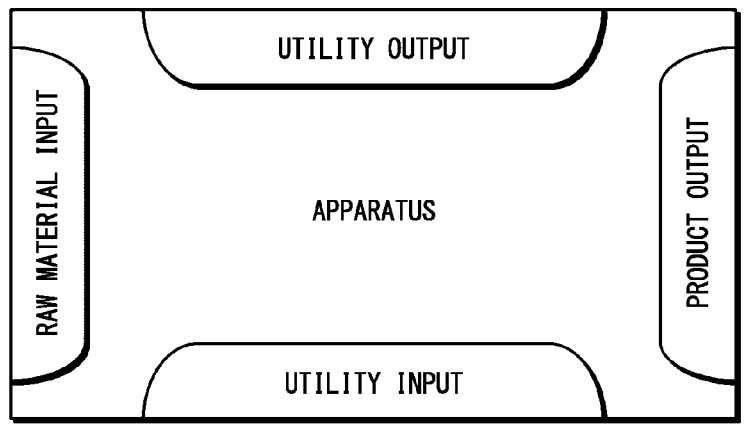
FIG. 3 is a diagram describing a symbol of an apparatus in a production and energy flow model.

In the production and energy flow model, the apparatus is represented by a symbol as shown in FIG. 3, and includes a "raw material input" to which a directed line indicating the input of the production-related material is connected, a "product output" to which a directed line indicating the output of the production-related material is connected, a "utility input" to which a directed line indicating the input of the energy is connected, and a "utility output" to which a directed line indicating the output of the energy is connected.

The directed line of the production-related material may be shown using different colors or different line types for each state of the product such as a gas-liquid mixing state and gas state or for each kind of material. Similarly, the directed line of the energy may be shown using different colors or different line types for each kind of heat, cold-water, electric power, and others.

Figure 4:
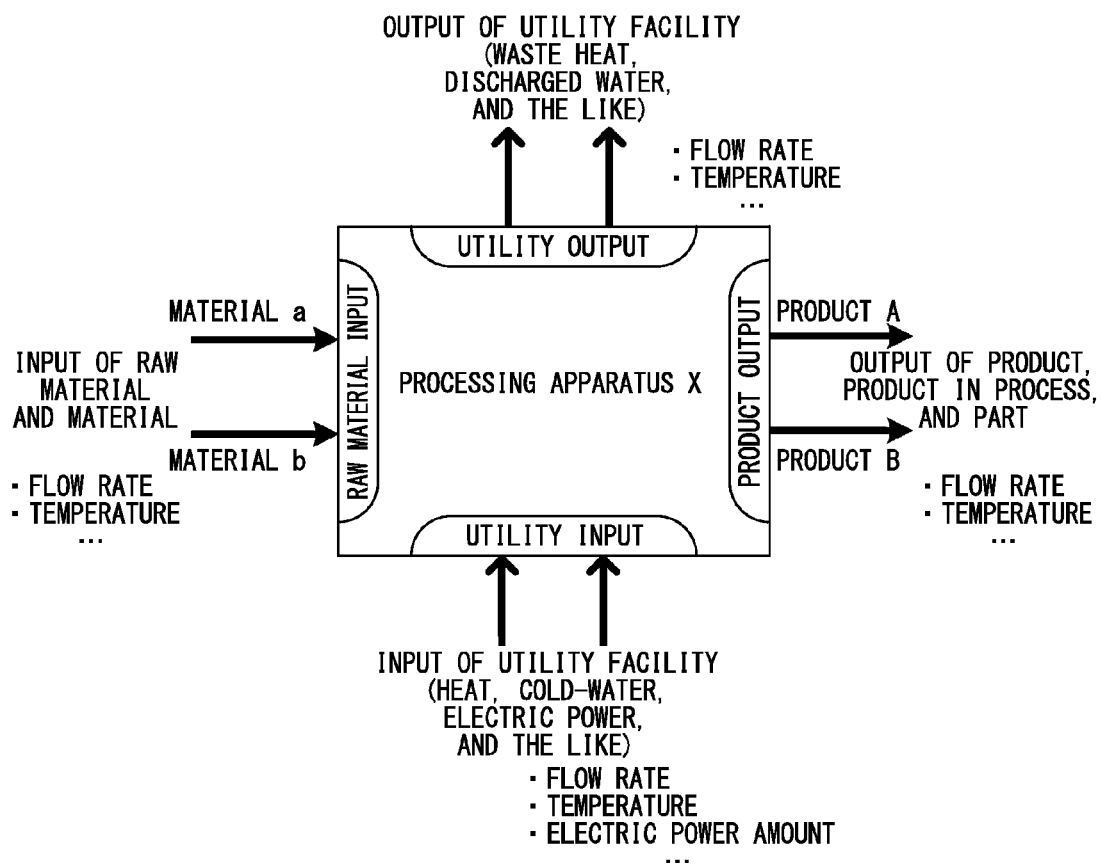
FIG. 4 is a diagram describing a directed line connected to the apparatus.

For example, as shown in FIG. 4, if a material a and a material b are input into one processing apparatus X, the directed lines of the material a and material b are connected to the "raw material input". The other end of the directed line of the material a is connected to the "product output" of an apparatus for supplying the material a and the like, and the other end of the directed line of the material b is connected to the "product output" of an apparatus for supplying the material b and the like.

Information of flow rate, temperature, and the like is associated with the material a and the material b to be input, and, in the modeling, the association of a flow gauge, a thermometer, and the like, which measure them, with the group 320 of various sensors in the continuous process plant 300 is also performed. Thereby, the flow rate, the temperature, and the like of the material a can be understood by referring to the metered data stored in the field database 120.

When the product A and the product B are output from the processing apparatus X, the directed lines of the product A and the product B are connected to the "product output". The other end of the directed line is connected to the "raw material input" of an apparatus, which is an output destination. If the output product is used as energy in other apparatus, the other end of the directed line is connected to the "utility input" in the other apparatus. Also, regarding the "product output", the association of the group 320 of various sensors with the flow rate and the like of the product A and the product B is performed.

When the energy such as heat, cold-water, and electric power is input into the processing apparatus X, the directed line is connected to the "utility input". The other end of the directed line is connected to the "utility output" of an apparatus for supplying energy, a driving force facility, or the like. Also, regarding the energy to be input, the association for the group 320 of various sensors, which measures flow rate, temperature, electric power amount, and the like, is performed.

When energy such waste heat and discharged water is output from the processing apparatus X, the directed line is connected to the "utility output". The other end of the directed line is connected to the "utility input" of an apparatus, which is an output destination, or the like. Also, regarding the energy to be output, the association for the group 320 of various sensors, which measures flow rate, temperature, electric power amount, and the like, is performed.

In any case, if the group 320 of various sensors in the continuous process plant 300 cannot directly measure flow rate, temperature, and the like, constants, estimates, and the like may be used. For example, the flow rate may be estimated based on a valve opening value and the like.

Figure 5:
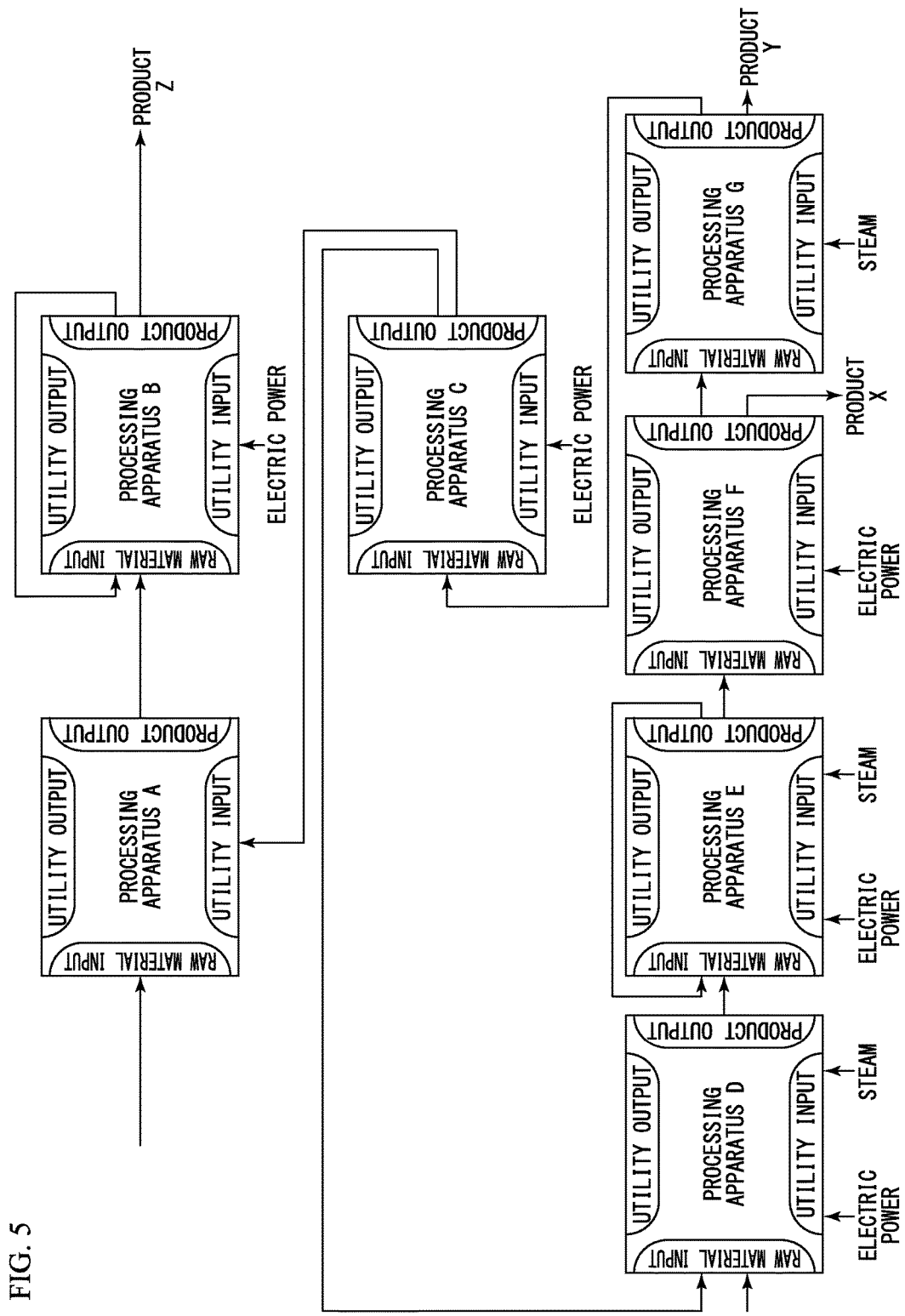
FIG. 5 is a diagram showing an example of the production and energy flow model.

FIG. 5 shows an example of the production and energy flow model where a plurality of apparatuses are connected to each other by directed lines. In the production and energy flow model, some apparatuses are collectively defined as a subsystem and treated as a single apparatus.

In addition, in the production and energy flow model, the management for each subsystem may be achieved using a hierarchical structure. Generally, a large-scale plant such as a petroleum refining plant consists of some plants, and each plant consists of some apparatuses. When trying to represent this using one hierarchy production and energy flow model, the number of apparatuses to be managed is huge in the entire petroleum refining plant. In order to dissolve the complexity, the product and energy flow model may be hierarchically structured.

In the example of the hierarchization of the product and energy flow model shown in FIG. 6, the entire petroleum refining plant is divided into the two plants, a utility plant and a manufacturing plant, the manufacturing plant is further divided into various apparatuses such as an atmospheric distillation apparatus, a desulfurization apparatus, and a reforming apparatus, each apparatus is divided for each device, and thereby the hierarchization is performed.

Figure 2:
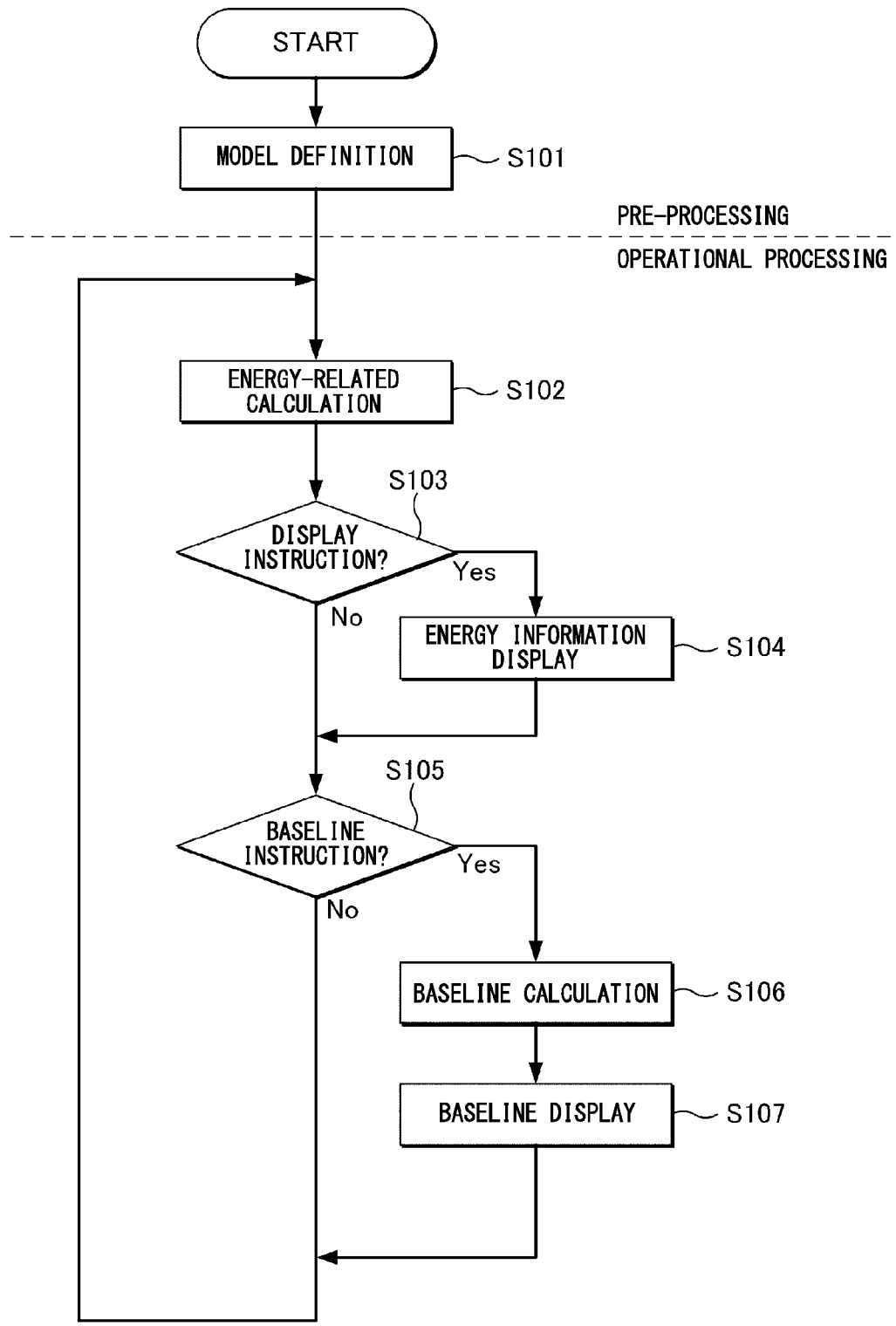
FIG. 2 is a flow chart describing the overview of the operations of the production energy management system according to the present embodiment.

Returning to the description of the flowchart in FIG. 2, after the model definition (S101) in the pre-processing is finished, the actual operational processing is started. The model definition may be appropriately updated in accordance with the configuration change of the continuous process plant 300 and the like even after the operational processing is started.

In the operational processing, an energy-related calculation (S102) is repeatedly performed in a predetermined period, for example, 1 minute, 10 minutes, or the like. Therefore, the latest energy-related information can be acquired and immediately applied to the operation.

In a petroleum refining plant or the like, the switching of crude oil tanks is frequently performed and the state of apparatus and external conditions such as a meteorological phenomenon are changed every second, but the production energy management system 100 can acquire the latest energy-related information and thus is suitable for the energy saving measures for such a continuous process plant.

When there is a display instruction of the energy-related calculation results from operators (S103: Yes), the energy information based on the energy-related calculation results is displayed (S104). Regardless of the presence or absence of instruction from operators, the display of the energy information may be performed in real time or periodically updated.

When there is an execution instruction of baseline processing from operators (S105: Yes), the calculation of the baseline is performed based on the instruction from operators (S106) and the display of the baseline information based on the calculation results is performed (S107). When the execution instruction of baseline processing is received from operators, the designation of target apparatus and the designation of target period are also received.

Next, the detail of the energy-related calculation (S102) in the operational processing will be described with reference to the flowchart in FIG. 7.

In the energy-related calculation (S102), first, the metered values of the field data required for the calculation of energy amount, production, and the like are read from the field database (S201).

The metered data required for the calculation of the energy amount, the production, and the like includes fuel flow rate, product flow rate, product temperature, steam flow rate, steam temperature, electrical current, voltage, integral power consumption, and the like. In the production and energy flow model, they are associated with the metered data measured by the group 320 of various sensors and stored in the field database 120 for each apparatus.

When reading the field data, the energy amount and the production are calculated for each apparatus (S202). There are some cases where only energy flows depending on the kind of apparatus, like a driving force facility. In this case, only the calculation of the energy amount is required.

Figure 8:
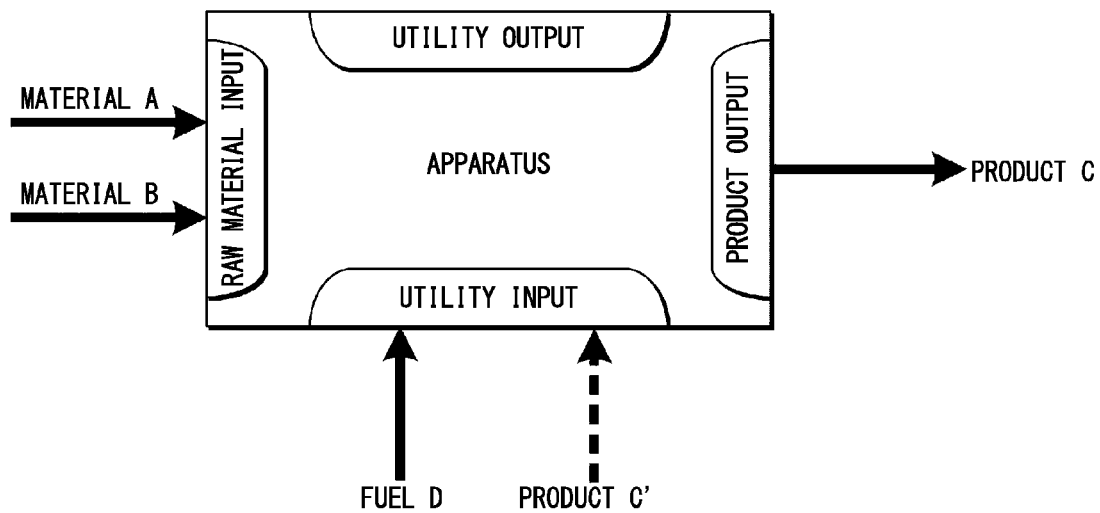
FIG. 8 is a diagram describing the energy-related calculation for a normal apparatus.

For example, as shown in FIG. 8, in a case of an apparatus where a material A and a material B are input a fuel D is added, and thereby a product C is output, the amount of each of the material A, the material B, the product C, the fuel D may be calculated based on the metered data of the flaw gauge and the like, and the energy amount to be added to the apparatus may be calculated based on the amount of the fuel D. As shown by a dot-line, a product C', which is a part of the product C, is burned, and thereby the energy amount to be added to the apparatus may be calculated.

If the potential heat of the product or material influences the energy amount, the potential heat of the product or material is used for the calculation of the energy amount. In other words, the amount or heat of the product or material may be used for, not only the calculation of the production, but also the calculation of the energy amount as the potential heat.

For example, a potential heat Ha of the material A may be calculated by a specific heat Sa of the material A*the amount of the material A*the temperature of the material A. The specific heat Sa of the material A may be obtained using a simulator of process prepared separately. When the simulator is not used, a table may be formed from an input-output result of an actual facility and the specific heat Sa may be estimated.

Generally, in the continuous process such as a petrochemical process, there are many heat processes for products and materials, and the products, which have been heated in the previous process, often use the heat in the next process again. The potential heat amount of interim products is changed for each process such as heat exchange, chemical reaction, resolution, and the like and the recovery of heat in each process is also performed. In addition, there are some cases where products and defective products are input as fuel. Therefore, the heat quantity, which the products have in each process, influences the energy balance in the next process, and also influences the cost. In the production energy management system 100 according to the present embodiment, the heat quantity is used for the energy calculation as the potential heat, and thereby the model suitable for the continuous process can be defined.

After the energy amount and the production are calculated, the calculation of the energy cost and $CO_2$ emission amount is performed (S203). The energy cost is calculated by multiplying the input energy amount by an energy unit price, which is determined for each energy source such as electric power, heavy-oil, and gas. The $CO_2$ emission amount is calculated by multiplying the input energy amount by a $CO_2$ emission coefficient, which is determined for each energy source.

The calculation of the energy efficiency in the apparatus is performed (S204). The energy efficiency is calculated from energy amount, which is input to the apparatus, and energy amount, which is effectively used and output. For example, the energy efficiency in the apparatus shown in FIG. 8 may be calculated from the potential heat of the product C/(the potential heat of the product A+the potential heat of the product B+the combustion heat quantity of the fuel D).

Next, the calculation of the specific energy consumption in the apparatus is performed (S205). The specific energy consumption may be calculated by dividing the energy amount, which is input to the apparatus when the products are produced, by the amount of the products.

Regarding the calculation of the energy amount input to the apparatus when the products are produced, there are some cases where a specific calculation corresponding to the attribute of the apparatus is required. The reason is that the apparatuses defined in the production and energy flow model include an apparatus including materials and energy in its inside or circulating the materials and energy, and the accurate evaluation cannot be performed when the energy consumption for each calculation cycle is simply integrated.

Figure 9:
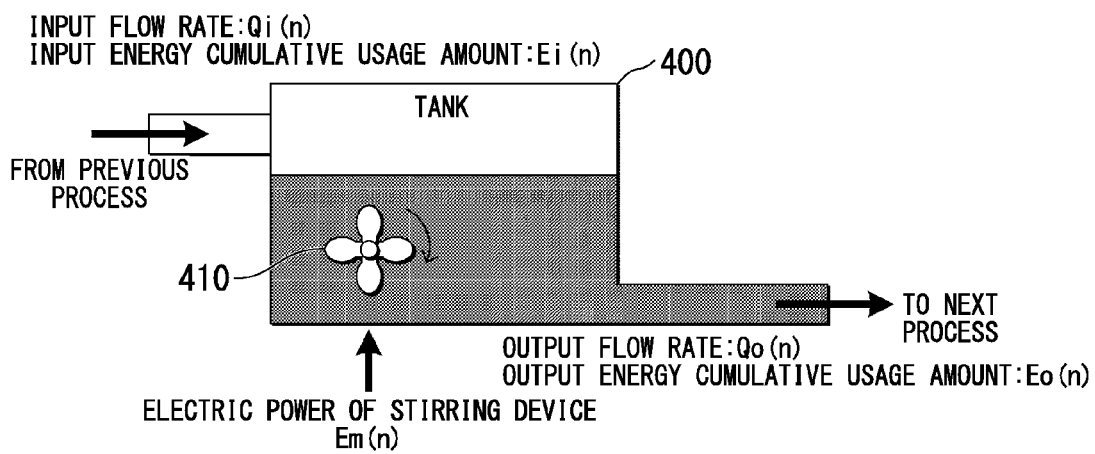
FIG. 9 is a diagram describing the energy-related calculation for a storing apparatus.

For example, if the apparatus as shown in FIG. 9 temporarily stores the products and the materials, by making a storing facility such as a tank 400 have energy cumulative quantity in terms of calculation, the case in which stirring, heating, and the like are performed in the storing facility or the input time of materials is different from the output time from the storing facility can be managed.

In the example shown in FIG. 9, when input flow rate from the previous process at a calculation timing n is defined as $Qi(n)$, input energy cumulative usage amount is defined as $Ei(n)$, output flow rate for the next process is defined as $Qo(n)$, output energy cumulative usage amount is defined as $Eo(n)$, electric power of a stirring device 410 is defined as $Em(n)$, storage amount in the tank 400 is defined as $S(n)$, and energy cumulative amount in the tank 400 is defined as $Es(n)$, the output energy cumulative usage amount $Eo(n)$ is represented by $Es(n-1)*Qo(n)/S(n-1)$.

The output flow rate $Qo(n)$ may be measured by a flaw gauge or estimated from a valve opening value. The storage amount $S(n)$ in the tank 400 may be calculated by subtracting the output total from the input total of the tank 400, in other words, $S(n)=\Sigma Qi(n)-\Sigma Qo(n)$. The storage amount $S(n)$ in the tank 400 may be estimated by a level gauge.

Since the energy cumulative amount $Es(n)$ in the tank 400 is equal to the last energy cumulative amount in the tank 400+the input energy cumulative usage amount+the energy amount used in the tank 400−the output energy cumulative usage amount, the energy cumulative amount $Es(n)$ may be calculated by $$Es(n)=Es(n-1)+Ei(n)+Em(n)-Eo(n).$$

Figure 10A:
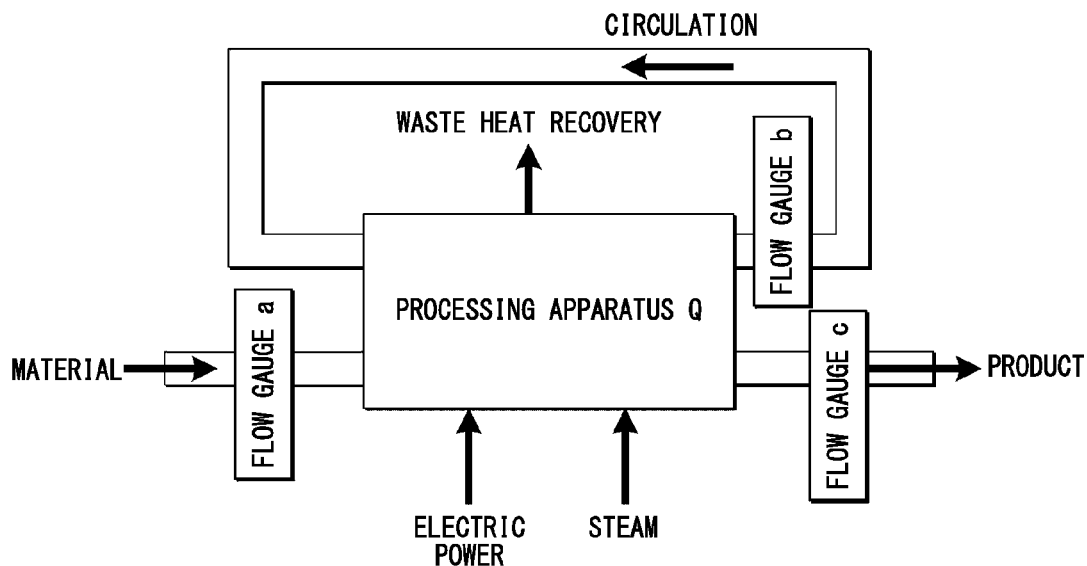
FIG. 10A is a diagram describing the energy-related calculation for a circulating apparatus.

In a case of a system where a circulation route is included and the output production-related material is circulated and re-input late, as a processing apparatus Q shown in FIG. 10A, by setting a delay time with regard to a pipe, on which the circulation is performed, the output data output the delay time before may be used as the input at the recovery destination of the circulation.

Figure 10B:
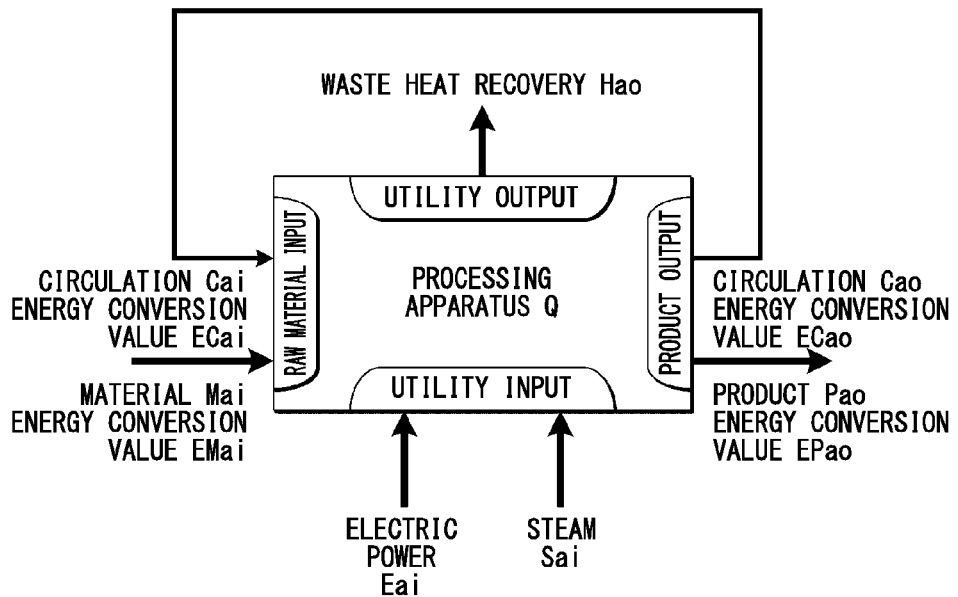
FIG. 10B is a diagram describing the energy-related calculation for the circulating apparatus.

For example, if the circulation amount and the energy conversion value are determined as shown in the apparatus model in FIG. 10B, regarding the balance of production-related material, the input of materials=the output of products, when the input of materials from the previous process at a calculation timing n is defined as $Mai(n)$, the input of circulation from the product output to the raw material input is defined as $Cai(n)$, the output of products is defined as $Pao(n)$, and the output of circulation from the product output is defined as $Cao(n)$, $$Mai(n)+Cai(n)=Pao(n)+Cao(n)$$

$$Cai(n)=Cao(n-1),$$

regarding the balance of energy, when the energy conversion value of the input of materials from the previous process at the calculation timing n is defined as $EMai(n)$, the energy conversion value of the input of circulation from the product output to the raw material input is defined as $ECai(n)$, the energy conversion value of the output of products is defined as $EPao(n)$, and the energy conversion value of the output of circulation from the product output is defined as $ECao(n)$, the input of electric power is defined as $Eai(n)$, the input of steam is defined as $Sai(n)$, and the recovery of waste heat is defined as $Hao$, Input of materials+Utility input=Product output+ Utility output $$\{EMai(n)+ECai(n)\}+\{Eai(n)+Sai(n)\}=\{EPao(n)+ECao(n)\}+(Hao)$$

$$ECai(n)=ECao(n-1)$$

In addition, the distribution of the circulation and the product in the product output may be a dynamic distribution in accordance with metered values, a distribution in accordance with a fixed ratio, or the like.

Figure 11:
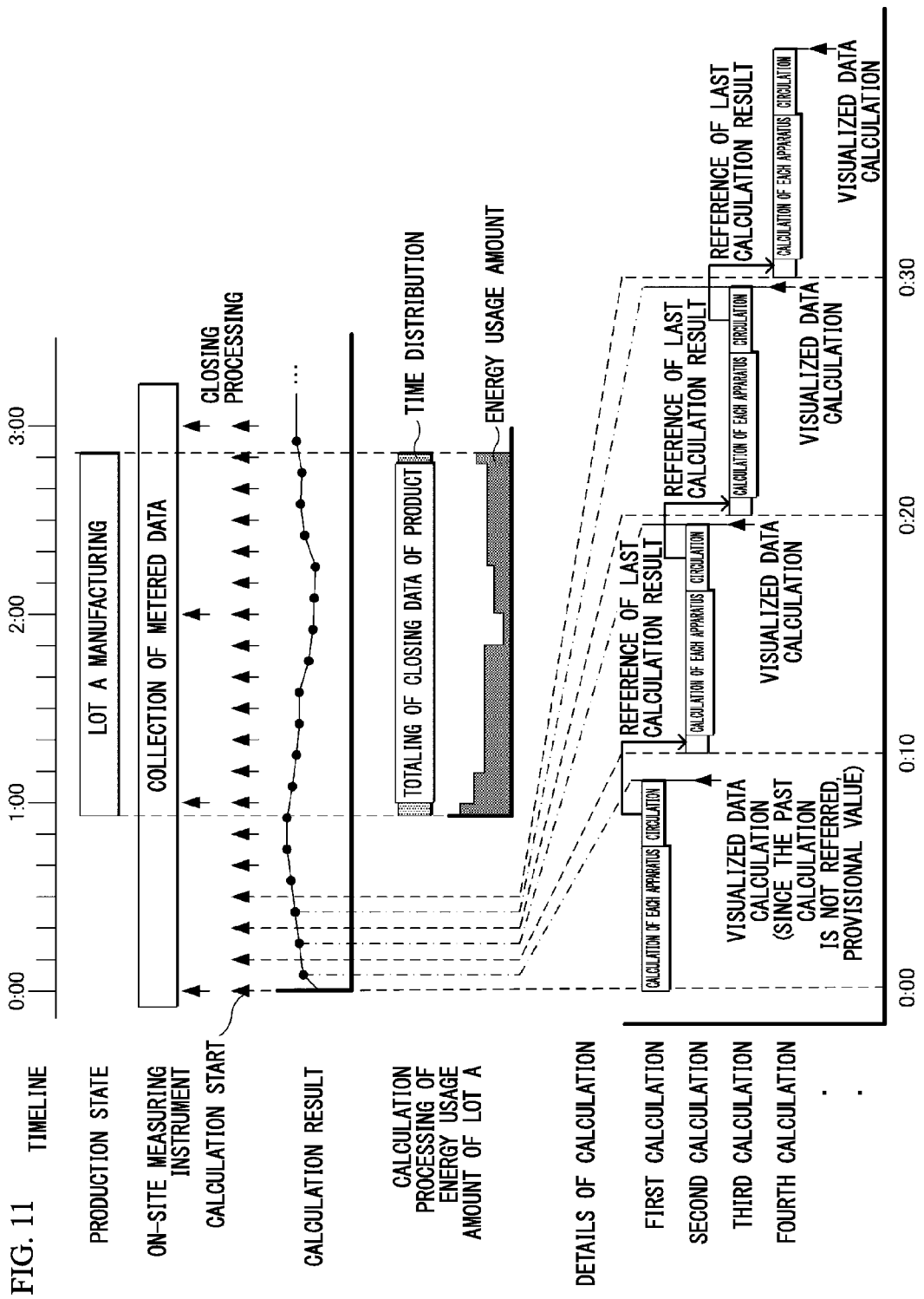
FIG. 11 is a diagram describing a specific example of the energy-related calculation for the circulating apparatus.

More specific calculation of energy consumption in the apparatus model shown in FIG. 10B will be described with reference to FIG. 11. In FIG. 11, the energy amount consumed by producing a "lot A" is a calculation target.

In the example of FIG. 11, the production energy management system is operated at 0:00, the calculation defined in the production and energy flow model is performed every 10 minutes. An on-site measuring instrument such as an electric power meter performs a measurement before the present system is operated and transmits metered data.

After the production energy management system is operated, at the first calculation, all of the calculations without considering the input of circulation among the calculation model are performed. Therefore, the calculated value at this time is provisional data. In the calculation after the second time performed every 10 minutes, all of the calculations including the input of circulation are performed. At this time, the input of circulation refers the last calculation result. Apart from the calculation every 10 minutes, a closing processing for performing the totaling of the calculation results for the period and the like is performed every a predetermined time, for example, 60 minutes.

Though, in the present calculation example, the example in which the last calculation result is referred, a plurality of calculation results including the current calculation result, the previous calculation result other than the last calculation result, and the like may be referred. A time delay indicating the controllability of the apparatus such as a transfer between apparatuses, a processing time, and a reaction time, a delay represented by a transfer function or a function specified by users, and other index values may be referred.

When the energy usage amount is calculated to form a product, for example, the time when the product is output is calculated based on the data. When the energy usage amount of the product "lot A" produced in the period from 0:56 to 2:52 is calculated, the following data are totaled in accordance with the closing time of the calculation. "0:56 to 1:00", "1:00 to 2:00", "2:00 to 2:10", "2:10 to 2:20", "2:20 to 2:30", "2:30 to 2:40", "2:40 to 2:50", "2:50 to 2:52"

Regarding "1:00 to 2:00", the closing data every 60 minutes may be used. In addition, regarding "2:00 to 2:10", "2:10 to 2:20" ... and "2:40 to 2:50", the calculation result every 10 minutes may be used.

On the other hand, since each of "0:56 to 1:00" and "2:50 to 2:52" is a cycle shorter than the cycle of calculation, the calculation result of the data for 10 minutes including the period is distributed in accordance with the time length. For example, if the energy usage amount for 0:50 to 1:00 is 250, the energy consumption for "0:56 to 1:00" is 100, which is calculated by multiplying 250 by 4/10. Similarly, if the energy consumption for "2:50 to 2:52" is 200, the energy consumption of 2:50 to 2:52" is 40.

The total of these calculation results is the energy amount consumed to produce the product "lot A".

When dividing the energy amount by the amount of products, the specific energy consumption is obtained. Using values specified by users such as the input value of raw materials, the production of interim products, and the unit area of a factory or a plant in accordance with the management conditions of users, the index values may be calculated based on a mathematical expression defined by users.

Though, in the present embodiment, the lot is described, for example, a calculation may be performed for each packaging unit of products, for each daily shipping volume, for each shipping destination, for each other unit of shipping products specified by users, for each purchase unit of materials, for each stored tank, for each other unit of raw material management specified by users, and for each management unit of interim products.

Figure 7:
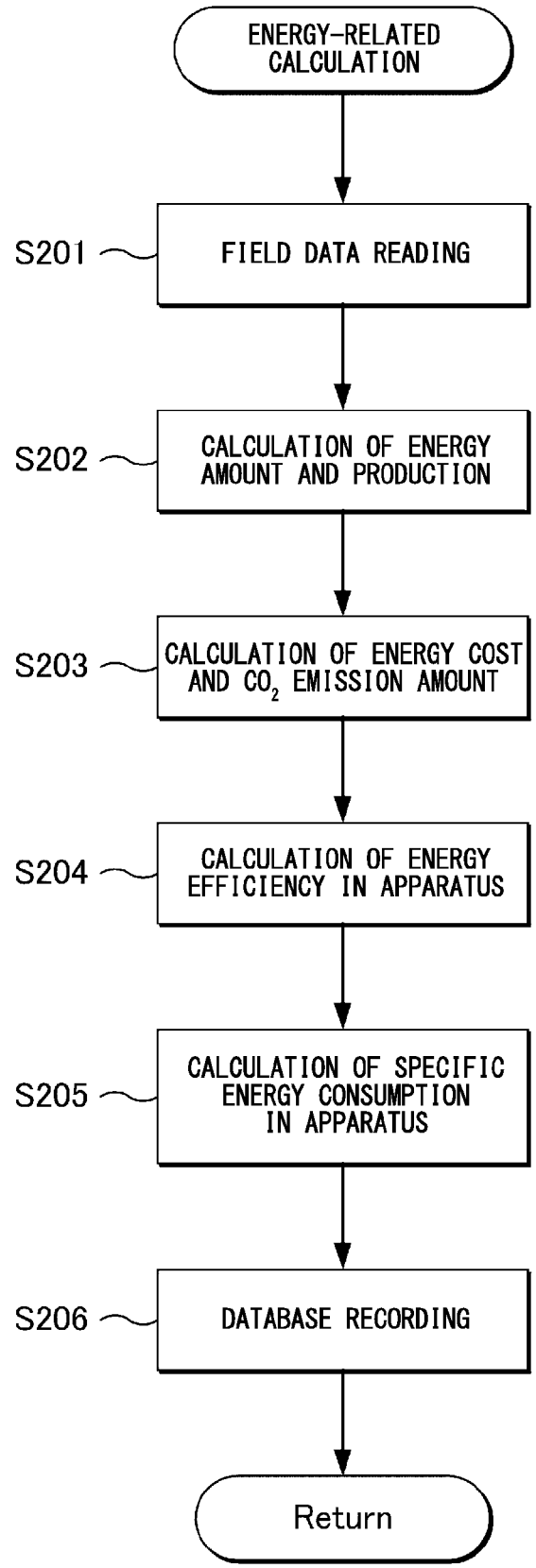
FIG. 7 is a flow chart describing the details of an energy-related calculation.

Returning to the description of the flowchart in FIG. 7, after the calculation of the specific energy consumption in the apparatus is finished (S205), each calculation result is recorded in the energy calculation result database 160 (S206).

Hereinbefore, the detailed procedure of the energy-related calculation (S102) in the flowchart of FIG. 2 was described.

Regarding the energy information display (S104) in the flowchart of FIG. 2, the energy consumption, the energy cost, the $CO_2$ emission amount, the energy efficiency, the specific energy consumption, and the like, which are for each apparatus and are obtained by the energy-related calculation, are displayed by various graphs such as a bar graph, a line graph, and a circle graph or displayed in tabular form, or the like, based on operator's instruction. In this case, arbitrary apparatuses may be collected and the period, which is a display target, may be arbitrarily set.

Figure 12:
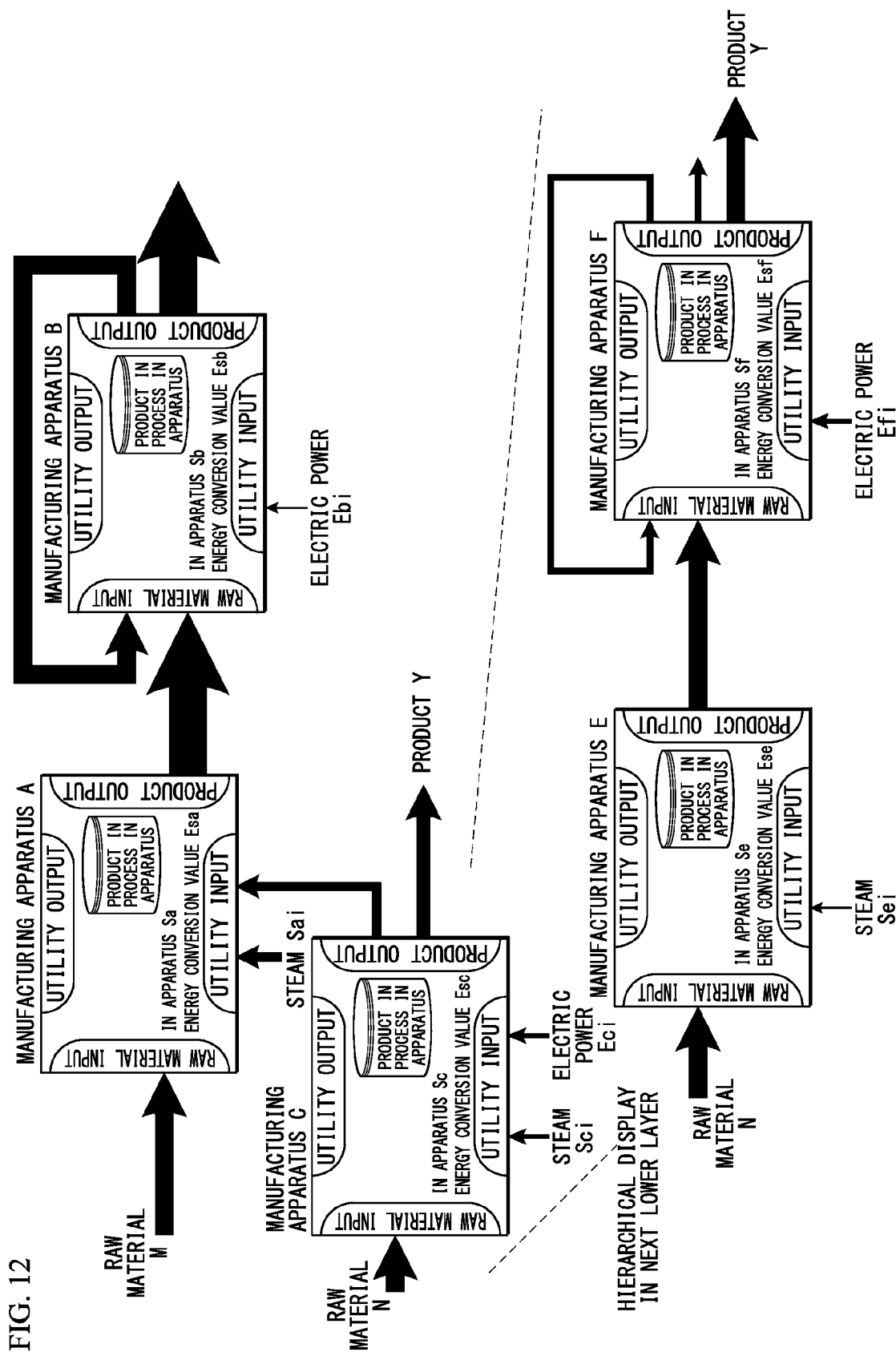
FIG. 12 is a diagram showing an example where the calculation results are shown in the production and energy flow model.

The calculation results may be displayed on the product and energy flow model or the schematic diagram of the product and energy flow model. For example, as shown in FIG. 12, the size of each of the energy consumption, the energy cost, the $CO_2$ emission amount, the specific energy consumption, the energy efficiency, the index value associated with a user setting, the index value of a combination thereof, the calculated index value, and the like may be visually represented by the width and the color of the directed line, the line type, and the like. The comparison results between each index value and the threshold value set by users, the analysis results using a baseline function described later, and the like may be visually represented by changing the directed line, the symbol of apparatus, and the like. The changing of the display form of the directed line, the symbol, and the like may be performed in the subsystem display or the hierarchical display of the subsystem.

Next, the baseline calculation (S106) and the baseline display (S107) in the flowchart of FIG. 2 will be described. As described above, in the baseline calculation, the processing to represent the relationship between the energy consumption and the factor using the baseline function from the energy calculation results for the period specified by operators.

When the improvement of the energy consumption is performed, the baseline may be used for verifying the effects and the like. In particular, the effects after the improvement may be verified based on the correlation between the results before the improvement of the energy consumption, the energy cost, the $CO_2$ emission amount, the energy efficiency, the specific energy consumption, and the like, which are obtained in the energy-related calculation (S102), and the factors, which influence the energy consumption and the like. Hereinafter, an example of the baseline with regard to the energy consumption will be described.

When the baseline function is generated, the setting of the targeted apparatus or the facility group and the result period is received from operators. Information to be considered as factors other than the field data such as the input-output value of energy, the input value of materials, the output value of products, and the temperature and humidity is input as the non-production and energy flow model information.

The non-production and energy flow model information may include the surrounding environment of the apparatus such as temperature and humidity, the operation mode of a plant, the kind and production area of materials, the weather, the rainfall amount, the operation state of line, alarm information, and the like.

Regarding the field data and the non-production and energy flow model information, when the information to be considered as factors is referred to as "factor candidates", the presence or absence of the association with the energy consumption for each candidate in the targeted period is evaluated using an analysis of variance or the like, and the refinement of the factors to be incorporated into the baseline function is performed.

In the targeted period, the data, which meets a predetermined condition, may be extracted and evaluated. For example, the predetermined condition is that the specific energy consumption is equal to or less than a reference value, or includes a specific operation mode, a specific day, and the like. Thereby, the data, which have almost the same operation condition as each other, may be extracted or the data in the period in which the energy saving is achieved may be extracted.

After the factors are refined, a multivariable analysis is performed with regard to the refined factor group and a model formula, which approximates the relationship between the energy consumption and each factor, is generated. This model formula is referred to as a baseline function. In this case, the correlation value, which indicates the degree of the approximation, may be clarified.

Since the generated baseline function is based on the past results, the energy consumption in the case that the improvement is not performed may be estimated by assigning the factors after the improvement. Graphical displaying and comparing of the estimated energy consumption and the actual energy consumption after the improvement enable the effects of the improvement to be visualized. Assigning of arbitrary values of the factor A and the factor B to the baseline function enables the energy consumption to be predicted.

Figure 13:
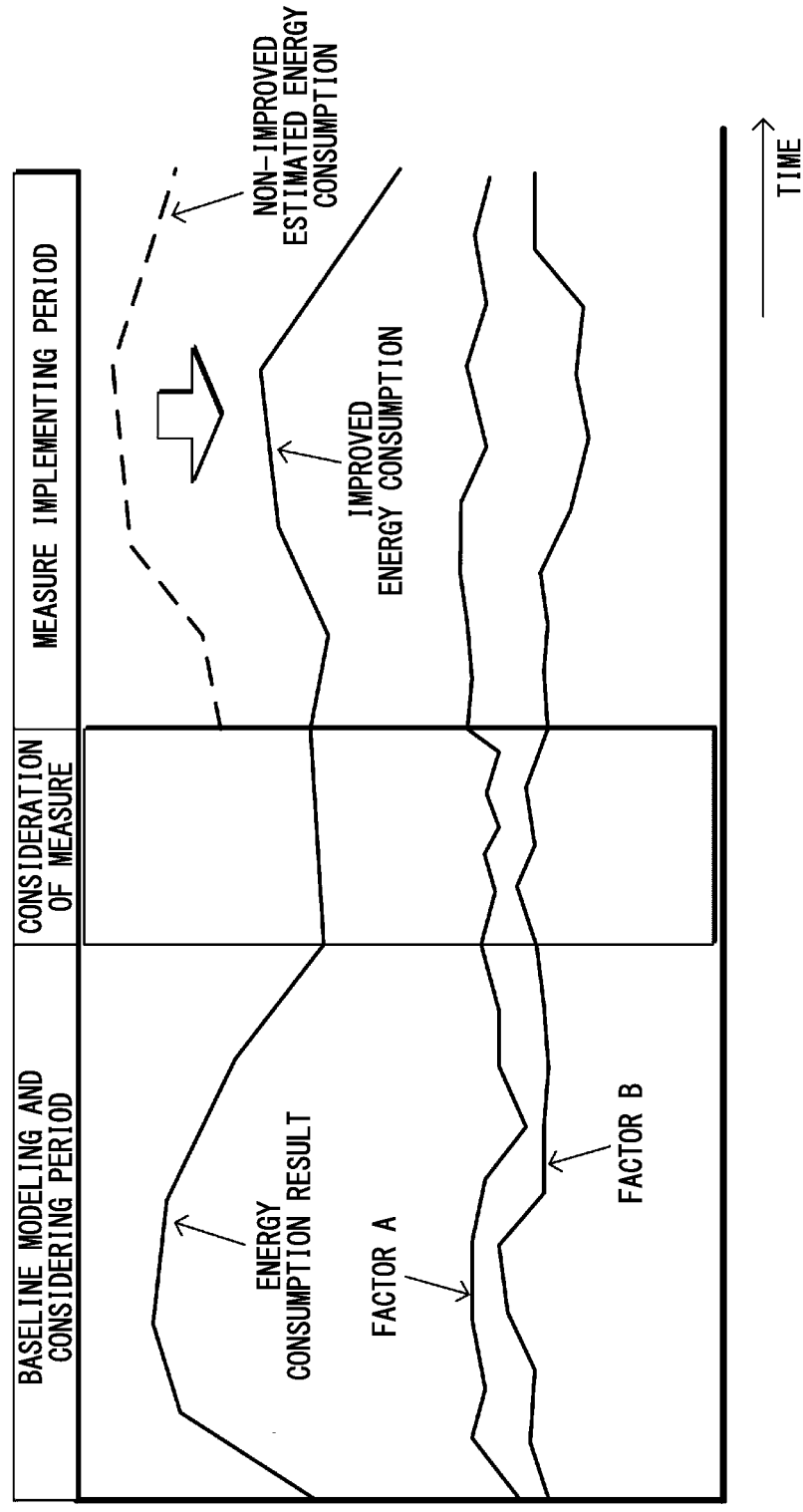
FIG. 13 is a diagram showing a display example of a baseline.
Figure 14:
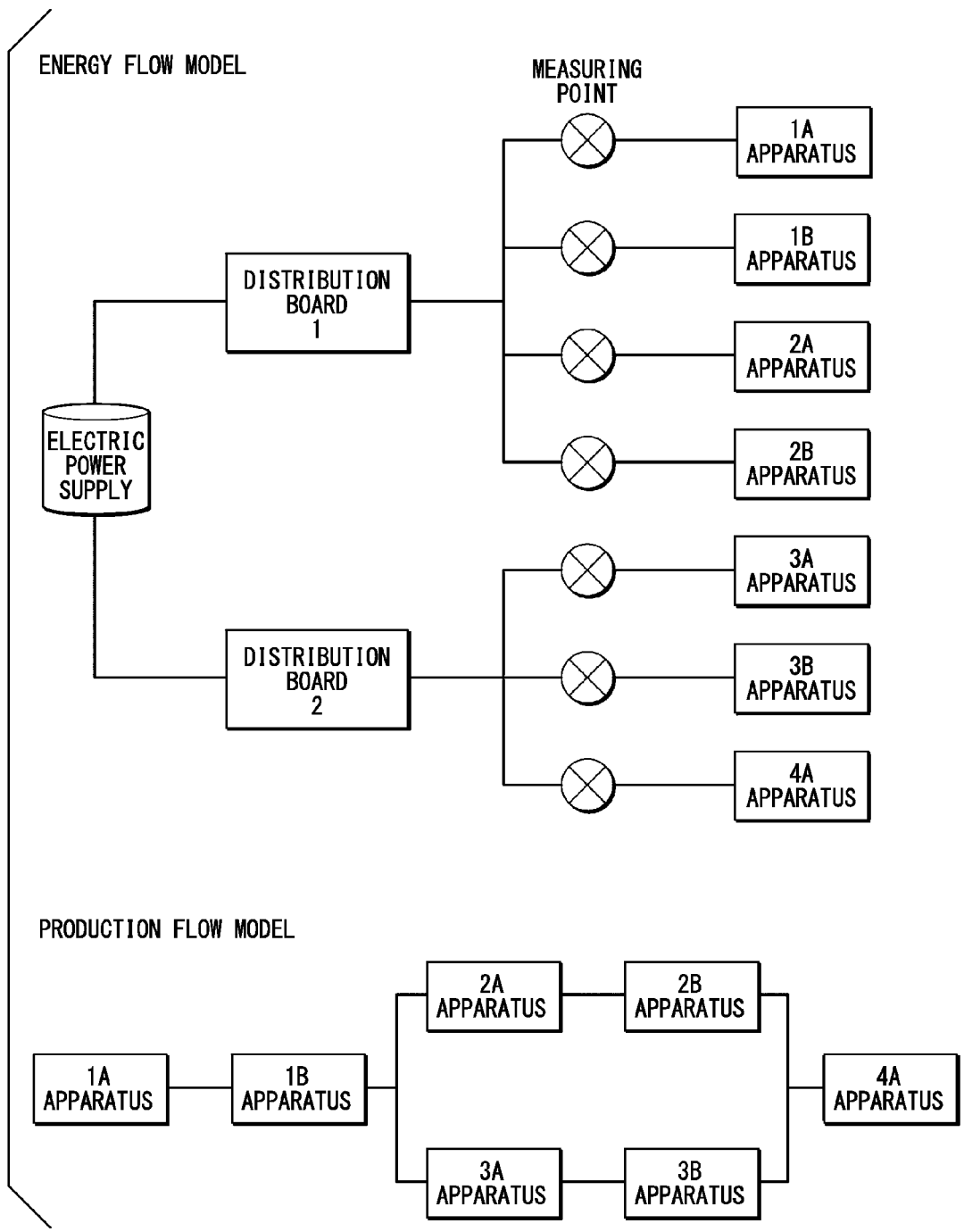
FIG. 14 is a diagram describing an energy flow model and a production flow model in a conventional production energy management system.

FIG. 13 is a diagram showing a graphical display example of the baseline. In the area of the baseline modeling and consideration period, the result value of the energy consumption before implementing the energy saving measures and the variation of the factor A and the factor B extracted as factors are shown. In the area of the measure implementing period, in addition to the energy consumption after implementing the energy saving measures and the variation of the factor A and the factor B, the variation of the estimated energy consumption in the case of non-improvement calculated using the baseline function is shown. The estimated energy consumption in the case of non-improvement has values obtained by assigning the factor A and the factor B after implementing the energy saving measures to the baseline function.

As shown in FIG. 13, the comparison of the energy consumption after implementing the energy saving measures and the non-improved estimated energy consumption enables the effects of the energy saving measures to be visually evaluated.

Using such a baseline, various evaluations suitable for the continuous process and the like other than the effects of the saving energy measures can be performed. For example, in a petrochemical plant, the energy consumption and the like is different depending on the kind of materials to be distilled, the change of products to be distilled, or the like, but the comparison of the actual operation data and the past operation data using the baseline enables the energy consumption in the operation state at the time to be evaluated.

Generally, the energy consumption is increased due to the scale adhesion in an apparatus as the operation time of the apparatus is increased. In this case, the maintenance of the apparatus is required to decrease the energy consumption, but the current energy consumption is evaluated using the baseline, and thereby the necessity of the maintenance can be considered. Thereby, it is expected that the failure due to the poor maintenance is prevented and the stable production state is maintained, and thereby the lifecycle of a plant is extended.

Hereinbefore, the production energy management system 100 according to the present embodiment has been described. In the present embodiment, the description has been provided for the continuous process plant 300, but the present invention is also applicable to processes other than the continuous process. The calculation with regard to the balance of heat quantity is mainly performed, but the present invention is applicable to a plant where addition to products in process and recovery in the later step are performed in manufacturing steps in the plant, for example, the calculation of the balance of water in a beverage plant or catalyst in a chemical plant.

There are some cases where, in a plant using steam, a process referred to as a steam extraction is performed where steam having high pressure and high temperature is input into an apparatus and stream having lower pressure and lower temperature than the input is input into other apparatus. The model according to the present invention is also applicable to the management in the case that the steam is used in two phases described above.

Using the energy calculation results of the production energy management system 100, a heat balance diagram (Sankey diagram) can be drawn with regard to an arbitrary facility group.

The functionality of the production energy management system 100 may be implemented by hardware, or implemented in a software manner. That is, a program that implements the functionality of the production energy management system 100 can be installed into a computer, thereby enabling the software-like implementation of the functionality of the production energy management system 100. The program that implements the functionality of the production energy management system 100 may be stored on a recording medium such as a CD-ROM, and may also be downloaded from a network such as the Internet.

The term "unit" is used to describe a component, section or part of an apparatus, and includes hardware and/or software that is constructed or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the following claims.

REFERENCE SIGNS LIST

100 Production energy management system
110 Field data collector
120 Field database
130 Production and energy flow model definer
140 Production and energy flow model database
150 Energy calculator
160 Energy calculation result database
170 Baseline model calculator
180 Baseline model database
190 Data display
300 Continuous process plant
310 Apparatus group
320 Group of various sensors
400 Tank
410 Stirring device

The invention claimed is:

1. A production energy management system for a plant having at least one sensor, comprising:
   a data collector communicatively connected to the sensor disposed in the plant and configured to collect data from the sensor;
   a production and energy flow model definer configured to define a production and energy flow model, the production and energy flow model representing, by directed lines, a flow with regard to an input and output of a production-related material between apparatuses disposed in the plant and a flow with regard to an input and output of energy, the production and energy flow model associating, with measurable data to be measured in the plant, index values of the production-related material and the energy, the measurable data being used for calculation of the index values;
   an energy calculator configured to perform an energy calculation for each apparatus based on the collected measured data and the defined production and energy flow model; and
   a baseline model calculator configured to calculate a baseline function, the baseline function representing a relational expression between an energy calculation result for each apparatus and a factor extracted based on an evaluation result with regard to a correlation with the energy calculation result,
   wherein the plant is managed based on the production and energy flow model and baseline function.

2. The production energy management system according to claim 1, wherein
   the energy calculator is configured to calculate at least one of an energy consumption, an energy cost, a $CO_2$ emission, a specific energy consumption, an energy efficiency, an index value associated with a user setting, and an index value of a combination thereof.

3. The production energy management system according to claim 1, wherein
   in the production and energy flow model, a symbol representing the apparatus includes a raw material input to which a directed line representing an input of the production-related material to the apparatus is connected, a product output to which a directed line representing an output of the production-related material from the apparatus is connected, a utility input to which a directed line representing an input of the energy to the apparatus is connected, and a utility output to which a directed line representing an output of the energy from the apparatus is connected.

4. The production energy management system according to claim 1, wherein
   the production and energy flow model includes, as the index value of the production-related material, a potential heat treated as an energy amount.

5. The production energy management system according to claim 1, wherein
   the production and energy flow model defines a circulation of the production-related material in the same apparatus as the flow with regard to the input and output of the production-related material.

6. The production energy management system according to claim 1, wherein
   the production and energy flow model defines, as the flow treating a part of or all of the production-related material as a fuel, a part of or all of the production-related material as an energy amount.

7. The production energy management system according to claim 1, wherein
   the production and energy flow model collectively defines a plurality of apparatuses as a subsystem and treats the subsystem as a single apparatus, and
   the subsystem includes a hierarchical structure.

8. The production energy management system according to claim 1, wherein
   the production and energy flow model defines a temporal storing of the production-related material in a storage apparatus as the flow with regard to the input and output of the production-related material.

9. The production energy management system according to claim 1, wherein
   the production and energy flow model defines, as the flow with regard to the input and output of the production-related material, a time delay of the production-related material with regard to a transfer between the apparatuses, a processing time, and a reaction time and a delay represented by a transfer function or a function associated with a user definition.

10. The production energy management system according to claim 1, further comprising:
    a data display configured to change a display form of the directed line in the production and energy flow model based on a calculation result by the energy calculator.

11. The production energy management system according to claim 1, further comprising:
    a data display configured to compare and display variation of an actual factor and an actual energy index value, and variation of an estimated energy index value calculated based on the actual factor and the baseline function.

12. The production energy management system according to claim 1, wherein
the factor includes at least one of an input amount of the production-related material, a temperature and a humidity around the apparatus, an operation mode of the plant, and a kind and a production area of the production-related material.

13. The production energy management system according to claim 1, further comprising:
a field database storing the measured data; and
a production and energy flow model database storing the production and energy flow model,
wherein
the energy calculator is configured to perform the energy calculation using the measured data stored in the field database in accordance with the production and energy flow model stored in the production and energy flow model database.

14. A production energy management method, comprising:
collecting data using a data collector communicatively connected to a sensor disposed in a plant and configured to collect the data from the sensor;
defining a production and energy flow model, the production and energy flow model representing, by directed lines, a flow with regard to an input and output of a production-related material between apparatuses disposed in the plant and a flow with regard to an input and output of energy, the production and energy flow model associating, with a measurable data to be measured in the plant, index values of the production-related material and the energy, the measurable data being used for calculation of the index values;
performing an energy calculation for each apparatus based on the collected measured data and the defined production and energy flow model; and
calculating a baseline function, the baseline function representing a relational expression between an energy calculation result for each apparatus and a factor extracted based on an evaluation result with regard to a correlation with the energy calculation result,
wherein the plant is managed based on the production and energy flow model and baseline function.

15. The production energy management system according to claim 11, wherein
the data display is configured to display the variation of the actual factor and the actual energy index value, and the variation of the estimated energy index value in a single page along a common time axis.

* * * * *